Patented Mar. 30, 1948

2,438,838

UNITED STATES PATENT OFFICE 2,438,838

PROCESS FOR THE PRODUCTION OF THIOPHENOLS

Seaver A. Ballard, Oakland, and De Loss E. Winkler, Berkeley, Calif., assignors to Shell Development Company, San Francisco, Calif., a corporation of Delaware No Drawing. Application April 26, 1944, Serial No. 532,888

18 Claims. (Cl. 260—609)

This invention relates to a process for the production of thiophenolic compounds which comprises reacting a phenolic compound with hydrogen sulfide in the presence or absence of a dehydration catalyst at a superatmospheric pressure. More particularly, the invention provides a method for the production of thiophenolic compounds by reacting a phenolic compound with hydrogen sulfide in the presence of a metal oxide dehydration catalyst at an elevated temperature and at a superatmospheric pressure.

The phenolic compounds employed as the organic reactant in the execution of the process of the invention are the phenols, that is, the aromatic hydroxy compounds, such as phenol and its homologues and analogues which contain at least one hydroxy group directly linked to a carbon atom of an aromatic ring. These phenolic compounds include the mono- or polyhydric derivatives of mono- or polycyclic aromatic compounds, and their mono- or polyhydrocarbon-substituted compounds. Representative phenolic compounds which may be reacted according to the process of this invention are phenol, the cresols, the xylenols, thymol, naphthol, o-phenylphenol, p-phenylphenol, resorcinol, guaiacol, pseudocumenol, carvacrol, pyrocatechol, quinol, orcinol, phloroglucinol, pyrogallol, hydroxyquinol, anthranol, phenanthrol, hydroxyquinolin, flavol and the like and their homologues. It is to be understood that a mixture of any of the above compounds may be used in the execution of the process of this invention. For example, it may be convenient to use a mixture of phenol and cresols such as is found in the commercial product known as cresylic acids. These phenolic compounds may be substituted by other substituents such as halogen, ester groups, and nitrogen-containing groups, etc. which will not interfere with the process of the reaction under the conditions maintained.

It has been discovered that in order to produce substantial yields of a thiophenolic compound, the reaction of hydrogen sulfide with a phenolic compound should be carried out at a superatmospheric pressure. By superatmospheric pressure is meant a pressure substantially above atmospheric pressure, usually above about at least two atmospheres pressure. In general, pressures above about 200 pounds per square inch have been found sufficient, and in most cases pressures above about 300 pounds per square inch are preferred. When a monohydric monocyclic phenolic compound such as phenol, a cresol, or a xylenol is reacted with hydrogen sulfide according to the process of the invention, pressures above approximately 400 pounds per square inch have been found effective in producing substantial yields of the corresponding thiophenols at temperatures between about 400° C. and about 600° C. Although any superatmospheric pressure is sufficient to effect the reaction of hydrogen sulfide with any phenolic compound according to the process of the invention, the optimum operating pressure in any case would depend upon the phenolic reactant, upon the nature of the thio-products desired, and upon the reaction temperature.

The reaction may be carried out at any convenient temperature, although elevated temperatures are preferred. The temperature at which the process of the invention is preferably executed is in the range of from about 400° C. to about 600° C. The specific temperature most desirable in any case depends upon the particular phenol reactant, upon the particular catalyst employed, upon the nature of the thio-products, upon the rate of flow of the feed and upon the superatmospheric pressure used. It has been found that higher yields may be obtained in many cases with the maintenance of a temperature between about 450° C. and about 550° C., for example when phenol, a xylenol or a cresol is reacted with hydrogen sulfide, particularly when the pressure is maintained above about 400 pounds per square inch.

The hydrogen sulfide and the phenolic compound may be reacted in any proportions, but for the sake of efficiency, it is generally desirable to use a molar excess of hydrogen sulfide over the phenolic compound. A mole ratio of hydrogen sulfide to phenolic compound of about 1:1 to about 10:1 will produce satisfactory results, although higher or lower mole ratios may be used if desired in some cases. Mole ratios of hydrogen sulfide to phenol of about 4:1 to about 8:1 have been found effective in producing substantial yields of the corresponding thiophenol.

The invention may be executed in any suitable type of apparatus, and the process may be carried out in a batchwise, intermittent or continuous manner, although the continuous process is preferred.

The reaction is preferably executed in the presence of a dehydration catalyst. The dehydration catalysts which may be used in the execution of the process of the invention are preferably selected from the group comprising the metal oxides such as aluminum oxide, thorium oxide, zirconium oxide, zinc oxide, iron oxide, chromium oxide, manganese oxide, magnesium oxide, barium oxide, calcium oxide, etc. The catalyst may be a solid substance which has an active surface due to its chemical nature and/or to its degree of subdivision or amount of available reaction surface. The catalyst may be in the form of a fine powder, in the form of pellets or other formed pieces of suitable size, or it may be in the form of fragments of suitable size. Single catalysts or mixtures of different catalysts may be employed, and they may be used with or without promoters and/or active or inert supports such as pumice, silica gel, activated charcoal, kieselguhr, etc. It has been found that catalysts containing a substantial amount of aluminum oxide are particularly suitable for effecting the reaction of phenolic compounds with hydrogen sulfide in accordance with the process of the invention. Especially suitable is a catalyst consisting of or comprising an activated alumina, i. e. an adsorptive alumina, which consists predominantly of alumina alpha monohydrate and/or gamma alumina, and which may or may not be impregnated with or contain some other suitable substance, e. g. activated alumina impregnated with lesser amounts of ferric oxide. Alumina catalysts which are characterized by their highly active adsorptive properties may be obtained from natural sources or they may be prepared by synthetic means. An efficient catalyst may be prepared by treatment of natural bauxite ore. It is generally known that bauxites have different physical and chemical characteristics, depending upon the locale from which they are obtained and upon the subsequent treatment accorded them. For example, the calcination temperature has a decided effect on the surface area and the adsorptive capacity of the resultant catalyst; the iron which is present may be capable of removal by magnetic methods, so the iron content may vary within wide limits, depending on the specific treatment; and the water content of a bauxite varies according to the degree of calcination employed. Certain selected bauxites, such as the activated bauxite sold in the trade by the Porocel Corporation under the trade name "Porocel" are particularly efficient and in fact comprise one of the preferred catalysts to be employed in the present process, not only because they result in highly improved yields, but also because of the considerably lower cost of such bauxites. A selected activated bauxite such as Porocel possesses a long catalyst life as well as the ability to bring about excellent conversions to the thiophenolic product. The selected activated bauxite sold under the trade name of "Porocel," as well as the adsorptive aluminas having the general physical and chemical characteristics of Porocel, are particularly suitable as catalysts for the reaction of hydrogen sulfide with a phenolic compound to produce a thiophenolic compound.

Other preferred catalysts consist of or comprise activated or adsorptive aluminas prepared by synthetic means. These synthetic aluminas may be prepared from gels which may be peptized or unpeptized, but they are preferably prepared from the crystalline form such as the crystalline alpha alumina trihydrate crystallized from alkali aluminate solutions. A well known activated alumina is that sold by the Auuminum Ore Company under the trade name "Alorco" (grade A). A variety of suitable means for activating alumina are in existence, such as the ones described in U. S. Patents 1,868,869 and 2,015,593. The process of U. S. Patent 1,868,869 comprises subjecting to calcination, at a temperature of from 300° C. to 800° C., the deposit which forms in the precipitate tanks and discharge pipes used in the execution of the Fickes-Sherwin modification of the Bayer process. Other suitable methods of preparing and activating the alumina catalyst will be apparent to those skilled in the art.

As has been stated above, if desired, a catalyst may be used comprising an activated alumina and some other suitable metal or metal compound such as the metal oxides mentioned above which may or may not be in chemical combination with the activated alumina on the surface thereof. Some of these catalysts may be prepared by direct impregnation of the activated alumina with a solution of the compound which it is desired to incorporate in the surface thereof, while others can only be prepared indirectly, for example, by impregnation with one compound followed by a conversion treatment whereby said compound is converted to the desired compound. Particularly suitable compound catalysts are those comprising an activated alumina and one or more iron oxides.

The hydrogen sulfide and phenol feed may be passed over the catalyst at any convenient rate, depending upon the temperature and pressure conditions in any specific case as well as upon the reactant and desired thio-products. Rates of from about 20 moles per liter of catalyst per hour to about 80 moles per liter of catalyst per hour generally produce suitable results although higher or lower rates may be used. When a monohydric monocyclic phenolic compound is reacted with hydrogen sulfide according to the process of the invention, the use of a feed rate in the range of from about 30 moles per liter of catalyst per hour to about 50 moles per liter of catalyst per hour has been found effective. For example, when hydrogen sulfide and phenol are reacted over Porocel at about 550° C. and at about 400 to 500 pounds per square inch pressure, a feed rate of approximately 40 moles per liter of catalyst per hour has produced suitable results.

The reaction may be allowed to take place for any suitable length of time. The optimum duration of the run in any case will depend upon the reactants and upon the temperature and pressure conditions maintained. Durations of from about one hour to about six hours are generally suitable although longer or shorter runs may be desirable in some cases.

If necessary, the reaction may be interrupted at any convenient point to permit regeneration of the catalyst which may have become deactivated to a greater or lesser extent, e. g. from carbonization caused by the elevated temperatures. The catalyst may be regenerated by any known means, such as by removing the carbon by suitable oxidizing means.

The thiophenols produced according to the process of this invention find a multitude of uses as additives to lubricating oils, as intermediates in organic syntheses, as insecticides, fungicides and parasiticides and as ingredients of insecticidal, fungicidal and parasiticidal compositions, and they may be used in the preparation of synthetic resins, rubber, vulcanization accelerators, and the like.

The following examples will serve to illustrate the execution of the process of this invention to those skilled in the art.

*Example I*

Hydrogen sulfide and phenol in a mole ratio of about 6:1 were reacted for about two hours over an activated bauxite catalyst sold under the trade name of "Porocel" at a feed rate of approximately 40 moles per liter of catalyst per hour, at a temperature of about 550° C. and a pressure of about 400 to about 500 pounds per square inch. A conversion to thiophenol of over 35 per cent resulted, with a yield on the order of about 50 per cent.

*Example II*

Hydrogen sulfide and phenol in about a 6:1 mole ratio were reacted for about five and one half hours at a feed rate of approximately 40 moles per liter of catalyst per hour over an activated bauxite catalyst sold under the trade name of "Porocel" at about 500° C. and a pressure of about 400 pounds per square inch to about 500 pounds per square inch. There resulted a satisfactory conversion of the phenol to thiophenol.

*Example III*

Hydrogen sulfide and 3,5-xylenol in a mole ratio of about 3:1 were reacted for about two and one half hours at a feed rate of approximately 40 moles per liter of catalyst per hour over an activated bauxite catalyst sold under the trade name of "Porocel" at about 525° C. and a pressure of about 500 pounds per square inch, to produce thioxylenol in a good yield.

*Example IV*

Hydrogen sulfide and phenol in a mole ratio of about 3:1 were reacted for four hours over an activated alumina catalyst sold under the trade name of "Alorco" (grade A), at a feed rate of approximately 40 moles per liter of catalyst per hour at a temperature of about 500° C. and approximately atmospheric pressure. There resulted only a 1% conversion to thiophenol.

Other thiophenolic compounds which may be prepared by obvious modifications of the procedures illustrated in the above examples are o-thiocresol, m-thiocresol, p-thiocresol, thionaphthol, the thioxylenols, thiothymol, o-phenylthiophenol, p-phenylthiophenol, 2,3,5-trimethylthiophenol, 2,3,5,6 - tetramethylthiophenol, pentamethylthiophenol, thioresorcinol, thioguaiacol, thiocarvacrol, thiopyrocatechol, thioquinol, thiopyrogallol, thiophenanthrol, and the like and their homologues.

We claim as our invention:

1. A process for the production of thiophenol which comprises reacting phenol with hydrogen sulfide in the presence of an activated bauxite catalyst at a temperature of about 550° C. and at a pressure above about 400 pounds per square inch.

2. A process for the production of thiophenol which comprises reacting phenol with hydrogen sulfide in the presence of a catalyst comprising crystalline alumina alpha monohydrate prepared by partial dehydration of crystalline alpha alumina trihydrate crystallized from alkali aluminate solutions, at a temperature of about 450° C. to about 550° C. and at a pressure above about 400 pounds per square inch.

3. A process for the production of thioxylenol which comprises reacting xylenol with hydrogen sulfide in the presence of an activated bauxite at a temperature of about 525° C. and at a pressure above about 400 pounds per square inch.

4. A process for the production of thiophenol which comprises reacting phenol with hydrogen sulfide in the presence of an activated bauxite catalyst at a temperature of about 450° C. to about 550° C. and at a pressure above about 400 pounds per square inch.

5. A process for the production of thioxylenol which comprises reacting xylenol with hydrogen sulfide in the presence of an activated bauxite sulfide in the presence of an activated bauxite at a temperature of about 450° C. to about 550° C. and at a pressure above about 400 pounds per square inch.

6. A process for the production of thiophenol which comprises reacting phenol with hydrogen sulfide in the presence of a catalyst comprising activated alumina at a temperature of about 450° C. to about 550° C. and at a pressure above about 400 pounds per square inch.

7. A process for the production of thioxylenol which comprises reacting xylenol with hydrogen sulfide in the presence of a catalyst comprising activated alumina at a temperature of about 450° C. to about 550° C. and at a pressure above about 300 pounds per square inch.

8. A process for the production of a thiophenol which comprises reacting a phenol with hydrogen sulfide in the presence of an activated bauxite catalyst at a temperature of about 450° C. to about 550° C. and at a pressure above about 300 pounds per square inch.

9. A process for the production of a thiophenol which comprises reacting a phenol with hydrogen sulfide in the presence of a catalyst comprising crystalline alumina alpha monohydrate prepared by partial dehydration of crystalline alpha alumina trihydrate crystallized from alkali aluminate solutions, at a temperature of about 450° C. to about 550° C. and at a pressure above about 300 pounds per square inch.

10. A process for the production of a thiophenol which comprises reacting a phenol with hydrogen sulfide in the presence of a catalyst comprising an activated alumina and ferric oxide incorporated in the surface thereof, at a temperature of about 400° C. to about 600° C. and at a pressure above about 300 pounds per square inch.

11. A process for the production of a thiophenol which comprises reacting a phenol with hydrogen sulfide in the presence of a catalyst comprising activated alumina at a temperature of about 450° C. to about 550° C. and at a pressure above about 400 pounds per square inch.

12. A process for the production of a thiophenol which comprises reacting a phenol with hydrogen sulfide in the presence of a catalyst comprising activated alumina at a temperature of about 400° C. to about 600° C. and at a pressure above about 300 pounds per square inch.

13. A process for the production of a thiophenol which comprises reacting a phenol with hydrogen sulfide in the presence of a catalyst comprising an alumina dehydration catalyst at a temperature of about 400° C. to about 600° C. and at a pressure above about 300 pounds per square inch.

14. A process for the production of a thiophenol which comprises reacting a phenol with hydrogen sulfide in the presence of a metal oxide dehydration catalyst at a temperature of about 400° C. to about 600° C. and at a pressure above about 300 pounds per square inch.

15. A process for the production of thiophenol which comprises reacting phenol with hydrogen sulfide in the presence of an activated bauxite catalyst at a temperature of about 550° C. and at a pressure between about 400 pounds per square inch and about 500 pounds per square inch.

16. A process for the production of thioxylenol which comprises reacting xylenol with hydrogen sulfide in the presence of an activated bauxite at a temperature of about 525° C. and at a pressure of about 500 pounds per square inch.

17. A process for the production of a thioxylenol which comprises reacting a xylenol with hydrogen sulfide in the presence of a catalyst comprising activated alumina at a temperature of about 400° C. to about 600° C. and at a pressure above about 300 pounds per square inch.

18. A process for the production of a thiophenol which comprises reacting a monohydric monocyclic phenol with hydrogen sulfide in the presence of a catalyst comprising activated alumina at a temperature of about 400° C. to about 600° C. and at a pressure above about 300 pounds per square inch.

SEAVER A. BALLARD.
DE LOSS E. WINKLER.

REFERENCES CITED

The following references are of record in the file of this patent:

UNITED STATES PATENTS

| Number | Name | Date |
|---|---|---|
| 2,116,182 | Bauer | May 3, 1938 |

OTHER REFERENCES

Sabatier et al.: "Comptes Rendus," vol. 150, pages 1220, 1570.